(No Model.)
H. H. LOCKWOOD.
TWO WHEELED VEHICLE.
No. 441,247. Patented Nov. 25, 1890.
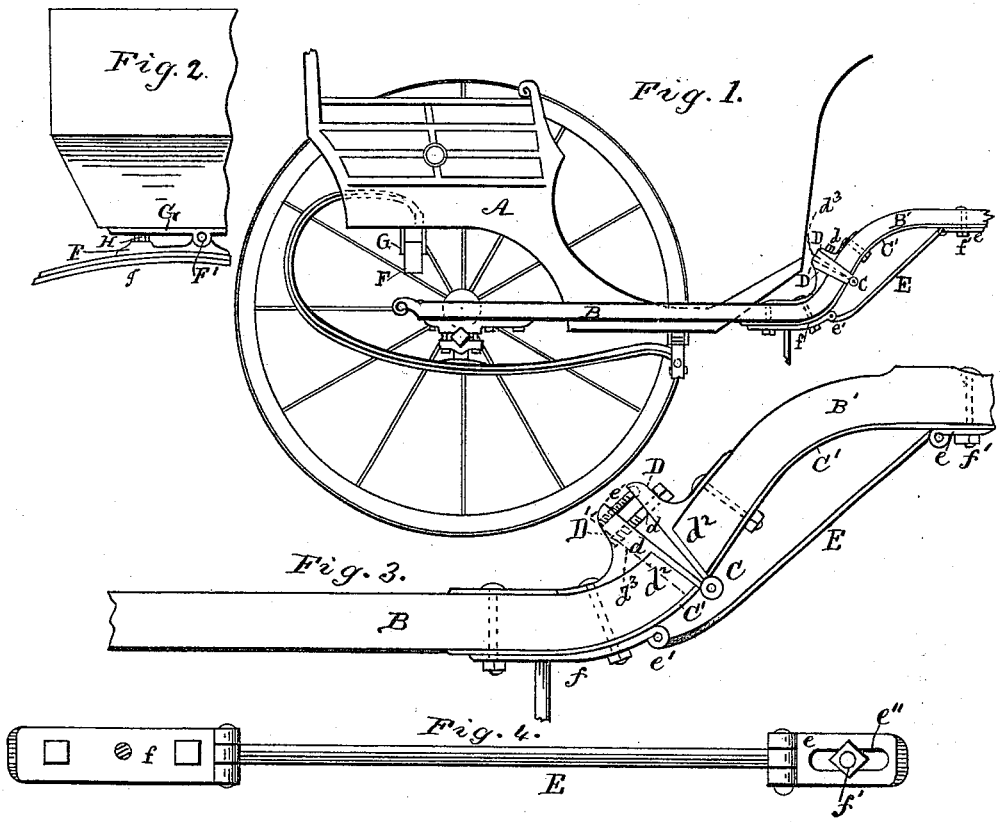
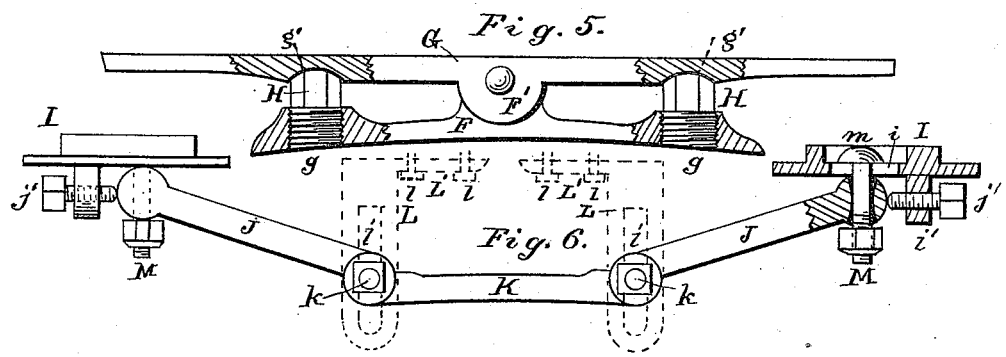
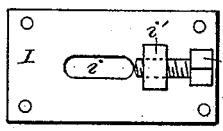
Witnesses
Thos Houghton
J. C. Schaefer
Inventor
Henry H. Lockwood
per W. H. Singleton
Attorney

UNITED STATES PATENT OFFICE.

HENRY H. LOCKWOOD, OF OLEAN, NEW YORK.

TWO-WHEELED VEHICLE.

SPECIFICATION forming part of Letters Patent No. 441,247, dated November 25, 1890.

Application filed May 31, 1890. Serial No. 353,838. (No model.)

*To all whom it may concern:*

Be it known that I, HENRY H. LOCKWOOD, a citizen of the United States, residing at Olean, in the county of Cattaraugus and State of New York, have invented certain new and useful Improvements in Two-Wheeled Vehicles; and I do hereby declare the following to be a full, clear, and exact description of the invention, such as will enable others skilled in the art to which it appertains to make and use the same.

This invention relates to improvements in wheeled vehicles, which will be hereinafter more particularly described and pointed out.

In the accompanying drawings, forming part of this specification, Figure 1 is a side view of a vehicle with the improvement attached. Fig. 2 is a partial view of the rear end of the body. Figs. 3, 4, 5, 6, and 7 are details which will be referred to and explained hereinafter.

A is the body of the vehicle.

B B' represent the shaft, which is made in two parts, which are united by a hinge-joint C, which is a part of the shaft-iron C'.

D D' is a device for adjusting the two parts B B' of the shaft to adapt it to any height of the animal. In the part D is a screw-threaded hole $d$ for the end of an adjusting-screw $d'$, which passes through the part D.

$e$ is a gage-screw, which is designed to gage the distance between D and D', so as to fix rigidly the angle of B' with B. The head of gage-screw $e$ has for its reception a socket in D. D and D' each have a projecting plate $d''$ $d''$ to cover the ends of the shaft B B'. On the piece D, on each side, is a flange $d^3$, projecting far enough to cover the opening, as shown in Fig. 2.

E is a brace-rod connected to a short plate $e$, beneath the shaft-iron C of the part B', and also to a strap $f$, beneath the shaft-iron C', under the part B, by a joint $e'$. The lateral movement of this rod E is accommodated by a slot $e''$ in the plate $e$, and secured by the screw-bolt $f'$, which also secures the plate and shaft-iron to the shaft.

By the foregoing device the shaft B' can easily be adjusted to any height of animal and secured at the proper angle by the gage-screw $e$ being adjusted to a proper length, and then, by means of the set-screw $d$, drawing the two parts D D' hard together, the shaft B B' will be rigidly secured and braced, the rod E being adjusted also by means of the bolt $f$.

The rear spring-bar is made of the parts F and G, secured together by the hinge-joint F'. At each end of the lower part F is a threaded hole $g$, in which is inserted a threaded pillar H, represented in Fig. 5 as hexagonal between the two parts F and G, as being of the best form for a wrench to take hold of, and as presenting the more ornamental appearance. The tops of these pillars are convex to fit into corresponding concavities in the bottom of the part G. This bar F G, being under the rear part of the body, is made thus for the purpose of adjusting the body to a proper level on the springs, which, after being used for some length of time, may have taken a set out of level by the constant weight of a heavy person seated always on the same side of the body. It will be seen at once that by the use of the screw-pillars the body can be properly adjusted.

In Fig. 6 is a device designed for raising or lowering the front part of the body. I I are slotted plates, which are secured to the under side of the sill on each side of the body. $i$ is the slot. $l'$ is a projecting lug, in which is a screw-nut for the purpose of adjustment of the arms J J, which are attached to the spring-block K by joints $k$ $k$. L L (shown in broken lines) are slotted guides, which are secured at their upper parts L' to the under side of the front part of the body by screw-bolts $l$ $l$. These guides L have slots $l'$ in them. The bolts $k$, which form the hinge-joints between the arm J and block K, pass through these slots $l'$, and by screwing them tightly the arms J and block K are adjusted to any position which may be required. The outer ends of the arms J have holes through them, and the bolts M pass through these holes, and the heads $m$ of these bolts rest in the slots $i$ $i$ of the plates I, and these arms J are secured in their outward movement by the set-screws $j$.

Having thus described my invention, what I claim is—

1. The shaft composed of two parts B B', hinged together at the hinge-joint C, and having the adjusting device D D', provided with the adjusting-screw $d'$, as set forth.

2. The shaft composed of two parts B B', hinged together at the hinge-joint C, and having an adjusting device at such joint, in combination with the covering-flanges $d^3$, which cover the opening at the joint, as set forth.

3. The body of a vehicle, in combination with the spring-bar composed of two parts secured across the body and having adjusting devices between the two parts, as set forth.

4. The body of a vehicle, in combination with the spring-bar secured across the body and composed of two parts hinged together at the middle and having adjusting devices at the ends, as set forth.

5. The combination of the spring-bar K, arms J J, slotted plates I I, screws $j'\ j'$, and guides L L with the body of the vehicle, as set forth.

6. In a two-wheeled vehicle, the combination of the body with a spring-bar secured to the front of the body and adjusting devices between the bar and the body, as set forth.

In testimony whereof I affix my signature in presence of two witnesses.

HENRY H. LOCKWOOD.

Witnesses:
W. H. SINGLETON,
GRAHAM L. GORDON.